United States Patent
May

Patent Number: 6,067,125
Date of Patent: May 23, 2000

[54] STRUCTURE AND METHOD FOR FILM GRAIN NOISE REDUCTION

[75] Inventor: William D. May, San Jose, Calif.

[73] Assignee: Minerva Systems, San Jose, Calif.

[21] Appl. No.: 08/857,084

[22] Filed: May 15, 1997

[51] Int. Cl.[7] .................................................. H04N 7/18
[52] U.S. Cl. ...................... 348/607; 348/451; 348/618; 348/619
[58] Field of Search ........................ 348/606, 607, 348/608, 610, 618, 619, 620, 97, 459, 621, 451, 452, 415, 416; H04N 7/18, 7/12

[56] References Cited

U.S. PATENT DOCUMENTS

| | | | |
|---|---|---|---|
| 5,442,407 | 8/1995 | Iu .............................................. | 348/620 |
| 5,502,489 | 3/1996 | Kim ........................................ | 348/607 |
| 5,512,956 | 4/1996 | Yan ......................................... | 348/606 |
| 5,742,343 | 4/1998 | Haskell ................................... | 348/415 |
| 5,742,344 | 4/1998 | Odaka ..................................... | 348/416 |
| 5,742,355 | 4/1998 | De Haan .................................. | 348/607 |
| 5,845,039 | 12/1998 | Ko .......................................... | 348/427 |

OTHER PUBLICATIONS

"Digital Image Enhancement and Noise Filtering by Use of Local Statistics", Jong–Sen Lee, IEEE Transactions on Pattern Analysis and Machine Intelligence, Jan. 1990, vol. PAM1–2, No. 1, pp.165–168.

"Adaptive Noise Smoothing Filter For Images With Signal–Dependent Noise", Darwin T. Kuan, etc., IEEE Transactions on Pattern Analysis and Machine Intelligence, Mar. 1985, vol. PAM1–7, No. 2, pp. 165–177.

"Refined Filtering of Image Noise Using Local Statistics", Jong–Sen Lee, Computer Graphics and Image Processing, vol. 15, No. 4, Apr. 1981, pp. 380–389.

"Estimation of Images Degraded By Film–Grain Noise", F. Naderi and A. A. Sawchuk, Applied Optics, vol. 17, No. 8, Apr. 15, 1978, pp. 1228–1237.

*Primary Examiner*—Mark R. Powell
*Assistant Examiner*—Wesner Sajous
*Attorney, Agent, or Firm*—Skjerven, Morrill, MacPherson, Franklin & Friel LLP; Edward C. Kwok

[57] ABSTRACT

A video signal is both spatially and temporally filtered. The output video signal is temporally noise reduced in portions of the image which exhibits little or no motion, and is spatially noise reduced in portions where motion exists. This approach is particularly applicable to reducing film grain noise in video material that originates from images on photographic films, since film grain noise is more correlated spatially than temporally.

14 Claims, 1 Drawing Sheet

STRUCTURE AND METHOD FOR FILM GRAIN NOISE REDUCTION

CROSS REFERENCE TO APPENDIX INCLUDING A COMPUTER PROGRAM LISTING

Appendix A, which is a part of the present disclosure, is an appendix consisting of 9 sheets of listing of a computer program and related data in one embodiment of this invention. This listing of computer programs contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF INVENTION

1. Field of the Invention

This invention relates to digital video processing. In particular this invention relates to using digital filters to efficiently compress video data that originates from motion picture or film.

2. Discussion of the Related Art

Under many compression standards, e.g. MPEG, the presence of noise in the video data severely degrades compression efficiency. In MPEG, for example, noise degrades interframe compression by adversely impacting the performance of "motion estimation," which achieves interframe compression by cross-referencing matching blocks of pixels in neighboring frames. In motion estimation, noise interferes with the identification of such matching blocks. In addition, noise also affects intraframe compression by reducing the correlation among neighboring pixel values, thereby reducing the compression efficiency achieved by quantizing video data transformed under a discrete cosine transform (DCT). Under fixed quantization, i.e., a variable output bit-rate approach, the noise degradation of interframe and intraframe compressions often leads to an increased output or encoded bit-rate[1] by as much as 100%. The increased encoded bit-rate results in higher transmission and storage costs. Alternatively, in a storage medium of a fixed capacity, e.g. in a compact disk (CD-ROM) or a digital video disk (DVD), such increased encoded bit-rate results in content reduction.

[1] "Bit rate" in this context refers to the number of encoded bits per unit time for a given bit-rate of uncompressed input video data.

It should be observed, however, that the impact of noise on video data is affected by two competing mechanisms. At high quantization, the high frequency noise components of the video data are quantized away to promote a lower encoded bit-rate. At low quantization, however, the noise is actually encoded in the compressed data to result in a higher encoded bit rate.

Film grain noise is a common source of noise in video data originated from a photographic film source, such as a motion picture. Film grain noise relates to the variability of photosensitive chemicals on the photographic film. Film grain noise, often causing "blotchiness" in the resulting decompressed video data, is part of the "film look" that most people desire to maintain in the encoded video. Thus, the complete removal of film grain noise is not always desirable. A detailed discussion of film grain noise can be found, for example, in an article "Estimation of Images Degraded by Film-grain Noise" by E. Naderi et al. Applied Optics, vol. 17, 1978. Naderi et al. propose the following model for film grain noise:

$$y_i = X_i + kn_i X_i^{1/3} \quad (1)$$

where $y_i$ is the observed pixel, $x_i$ is the original (unknown) pixel value, $n_i$ is a random noise variable ("white noise") having a Gaussian or normal distribution $N(0,\sigma^2)$, and k is an arbitrary constant.

Naderi et al. propose a filter for estimating and removing film grain noise according to this model. The non-linear term in equation (1), however, would require calculating a covariance matrix, which is too computationally intensive for a real-time application. Further, Naderi et al.'s model is applicable only to still images, i.e. noise reduction which exploits the image's spatial correlation. Since film grain noise is less correlated temporally than spatially, Naderi et al.'s model fails to exploit temporal noise reduction which is expected to yield even higher noise reduction performance.

Various locally adaptive noise reduction filtering techniques to reduce noise in video data are reported in (i) "Adaptive Noise Smoothing Filter For Images with Signal Dependent Noise" by D. Kuan et al., IEEE Transactions on Patten Analysis and Machine Intelligence, Vol. PAMI-7, No. 2, March 1985, pp. 165–177; (ii) "Digital Image Enhancement and Noise Filtering by Use of Local Statistics" by J. S. Lee, IEEE Transactions on Pattern Analysis and Machine Intelligence, Vol. PAMI-2, No. 2, March 1989, pp. 165–168; and (iii) "Refined Filtering of Image Noise Using Local Statistics", Computer Graphics & Image Processing, Vol. 15, No. 4, April 1981, pp. 380–389. In addition, the text "Two-Dimensional Signal & Image Processing" by J. S. Lim, published by Prentice Hall, 1990, is a general text applicable to various aspects and techniques of image processing.

SUMMARY OF THE INVENTION

The present invention provides a system for temporal and spatial reduction of noise in a video signal. In one embodiment of the present invention, a system provides both a temporal filter and a spatial filter, each receiving the same input video signal, to provide both a temporal noise reduced video signal and a spatial noise reduced video signal, and a motion signal indicative of motion in the video signal. In that embodiment, a weighted average circuit then combines the temporal noise reduced video signal and the spatial noise reduced video signal according to the motion signal, to provide an output video signal which is weighted towards the temporal noise reduced signal, when the motion signal indicates no motion, and which is weighted towards the spatial noise reduced video signal, if motion above a given threshold is detected.

In one embodiment of the system of the present invention, spatial noise reduction is achieved using local statistics, such as means and variances. Under the present invention, the spatial and temporal filters can be implemented using adaptive Wiener filters. One implementation of the adaptive Wiener filter is achieved in an embodiment of the present invention using a piecewise linear approximation to its transfer function.

In one embodiment of the present invention, for each pixel processed, the spatial filter takes into account pixels of the input video signal configured in a 5-pixel kernel. In that embodiment, the temporal filter computes a weighted average of corresponding pixels in the current input frame and the previous output frame, thus forming a single-pole infinite impulse response (IIR) filter.

In one embodiment of the present invention, the motion signal represents a difference between pixels in successive frames, and the weighting function of the combined output video signal are non-linearly weighted with respect to the motion signal, such that the temporal noise reduced video signal dominates the output video signal when the input video has little or no motion, and the spatial noise reduced video signal quickly takes over the output video signal with a slight increase in motion. In this manner, very effective noise reduction is achieved, since noise (e.g. film grain noise) is less correlated temporally than spatially, while temporal artifacts and spatial blurring of the image are substantially avoided.

The present invention provides high encoding efficiency at high encoded bit-rates. In one implementation, significant improvement in encoding efficiency was observed above 4 megabits per second. Thus the present invention is particularly applicable to high quality MPEG-2 encoding, such as proposed for use in DVD.

DETAILED DESCRIPTION OF THE PREFERRED EMBODIMENT

The present invention is based on a system in which a video image is filtered both temporally and spatially, using the following simplified linear model of noise:

$$y_i = x_i + n_i \tag{2}$$

where $y_i$ is the observed pixel value, $x_i$ is the original (unknown) pixel value, and $n_i$ is a random noise variable having a Gaussian or normal distribution $N(0, \sigma^2)$.

Under the present invention, a temporal infinite impulse response (IIR) filter can be used to remove film grain noise without softening or blurring the image. To avoid motion-induced side effects of a temporal filter, i.e., motion smearing and after images, this temporal IIR filter is applied only on pixels where little or no motion is detected. On pixels where motion is detected, a spatial noise reduction technique is applied instead. Since human vision is less sensitive to softening of moving objects, the present invention provides noise reduction with minimal impact on the observed visual quality of the image. Thus, the present invention provides high quality encoding performance.

Figure 1:
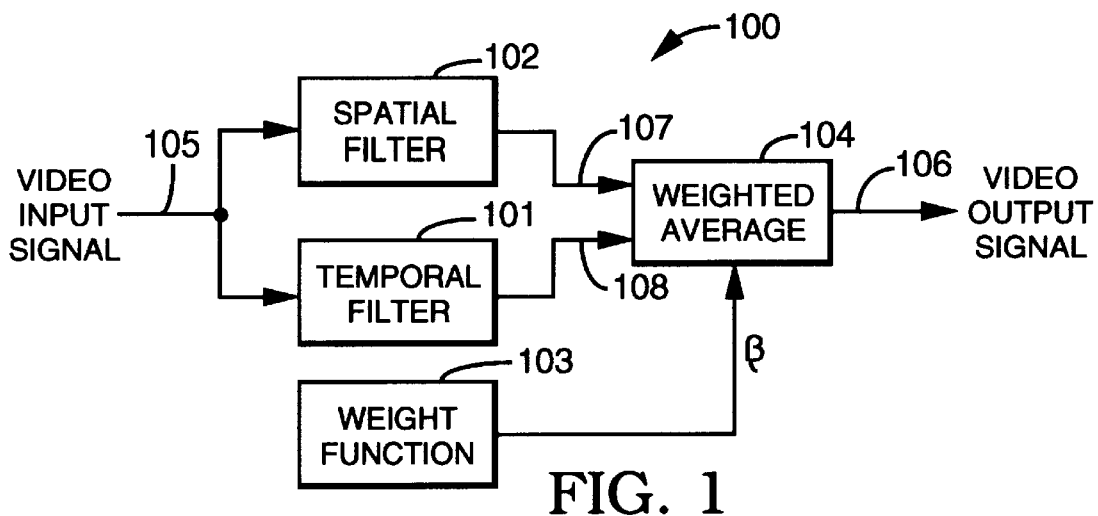
FIG. 1 is a block diagram showing a system 100 which includes both spatial and temporal filtering of a video signal, in accordance with the present invention.

FIG. 1 is block diagram showing a system 100 which includes both temporal and spatial filtering of a video signal, in accordance with the present invention. As shown in FIG. 1, a video input signal, received into system 100 at terminal 105, is provided to a temporal filter 101 and a spatial filter 102. The temporal filter 101, based on the difference in corresponding pixel values between the current input frame and the previous output frame, provides a difference value indicative of motion, so that weight function filter 103 can compute a weight function $\beta$ for weighting the output video signal. In this embodiment, as discussed in further detail below, a non-linear weight function $\beta$ is provided in weight function filter 103 to avoid temporal filtering artifacts and the hard edge cutoffs that become visible as edges and contours in the image. With a weight function $\beta$ derived at weight function filter 103, an averaging circuit 104 provides an output video signal at terminal 106 as a weighted average of the respective filtered signals of temporal filter 101 and spatial filter 102 at terminals 108 and 107. In practice, as discussed in further detailed below, the present embodiment achieves high film grain noise removal performance.

Figure 2:
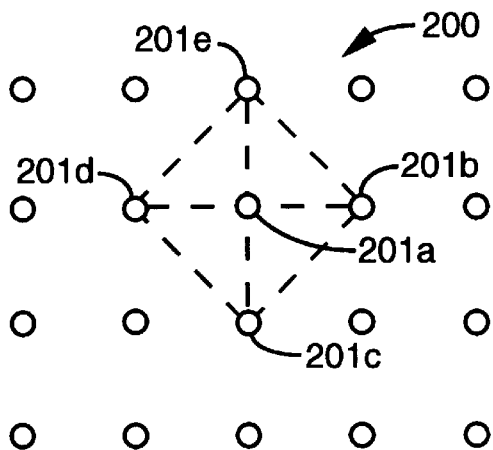
FIG. 2 shows a configuration 200 consisting of a 5-pixel kernel used by spatial filter 102.

Spatial filter 102 uses a 5-pixel kernel in the configuration 200 shown in FIG. 2. As shown in FIG. 2, for each pixel filtered, spatial filter 102 takes into account five pixels, consisting of the observed value of the pixel itself, indicated by reference numeral 201a, and the observed values of its four closest neighbors, indicated by reference numerals 201b–201e. Using a 5-pixel kernel, rather than a 9-pixel kernel, for example, reduces the softening effects of the spatial filter, and allows a more efficient implementation in a typical digital signal processor, such as one or more TI MVPs (e.g., the TMS 320C80 digital signal processor integrated circuit). In one implementation, two such MVPs are used to process the pixel values of the luminance component ("luma"), with the pixels of the chrominance components ("chroma") bypassed. In that implementation, using 40 MHz MVP's, a performance of 40 milliseconds per image is achieved on NTSC CCIR-601 images. Temporal filter 101 and spatial filter 102 can be used to process the chroma of the image as well, with the resulting filtered chroma weighted according to the same weight function derived from the luma by weight function circuit 103. Using the same weights for both luma and chroma processing eliminates possible color balance artifacts relating to the noise reduction algorithm.

In this embodiment, the video input signal at terminal 105 is a frame-based video signal, i.e., each frame of the video signal is a complete image not divided into even and odd fields, as is the case, for example, for NTSC television signals resulting from film originated video, after the inverse telecine operation.

Spatial filter 102 first computes local image statistics for each filtered pixel. In this embodiment, the local statistics include the mean and variances of the pixels of the 5-pixel kernel. A scaling factor, described below, is selected to avoid overflow, and to allow arithmetic multiplication to be achieved using the more efficient shift instructions of the digital signal processor, rather than the more time-consuming multiply instructions. In an implementation involving multiple processors sharing a common memory, multiple pixels can be packed into a memory word and provided aligned to word boundaries, so that multiple pixels can be processed simultaneously from a single access. In this embodiment, spatial filter 102 computes a scaled mean value $\mu_s$, which is defined as:

$$\mu_s = \frac{1}{\sqrt{40}} \sum_{i=1}^{5} p_i = \frac{5}{\sqrt{40}} \mu \tag{3}$$

where $p_i$ is the observed pixel value and $\mu$ is the unscaled mean. The value $$\frac{1}{\sqrt{40}} \quad (0.15811\ldots)$$

is selected because it can be approximated in this application by the hexadecimal value $28 (0.15625). The binary representation of the value $28 allows multiplication operations involving it to be conveniently achieved using shift instructions.

Likewise, spatial filter 102 computes a scaled sum of squares ss defined as follows:

$$ss = \frac{1}{8} \sum_{i=1}^{5} p_i^2 \qquad (4)$$

Again, the value $$\frac{1}{8}$$

is selected to allow the multiplication operation to be efficiently performed by a shift operation. The scaled variance $\sigma^2$ is related to the scaled sum of squares ss by:

$$\frac{5}{8}\sigma^2 = ss - \mu_s^2 \qquad (5)$$

The scaled variance $\sigma^2$ can then be used in a standard adaptive Wiener filter, such as that described in the text "Two-Dimensional Signal & Image Processing" by J. S. Lim, published by Prentice Hall, 1990 (See, for example, §9.2.4 pp. 536–540). Under an adaptive Weiner filter, a noise-reduced pixel $w_i$ is provided by the following expression:

$$w_i = \alpha p_i + (1-\alpha)\mu \qquad (6)$$

where $\alpha$ is a characteristic value of the adaptive Wiener filter, obtained in the manner described below.

Recalling that $\mu$ and $\mu_s$ are related by equation (3) above, the value of $\mu$ can be achieved by multiplying $\mu_s$ by $$\frac{\sqrt{40}}{5},$$

which can be conveniently approximated by the hexadecimal value $147 (i.e., 1.277). The characteristic value a of the adaptive Wiener filter is given by the expression:

$$\alpha = \frac{\sigma^2}{\sigma^2 + \sigma_n^2} \qquad (7)$$

where $\sigma_n^2$ is the variance of the noise random variable.

The value of $\alpha$ can be looked-up during run-time from a table tabulating the value of $\alpha$ for each value of $\sigma_n^2$ frame. However, such a table look-up approach is inefficient for three reasons. First, a frame latency is incurred during calculation of $\sigma$'s in the table. Second, a table look-up operation incurs a memory access latency. Third, such a table occupies a significant amount of memory. Alternatively, the value $\alpha$ can be calculated using a piecewise linear approximation. In this embodiment, the piecewise linear approximation consists of two linear pieces: (i) a horizontal line segment ($\alpha=1$) for $\sigma^2>1.25\,\sigma_n^2$; and (ii) a segment in ($\sigma^2$, $\alpha$) space having a slope of 2, given by the equation:

$$\alpha = \max\left(0, 2 * \frac{\sigma^2}{\sigma_n^2} - 1.5\right) \qquad (8)$$

Figure 3:
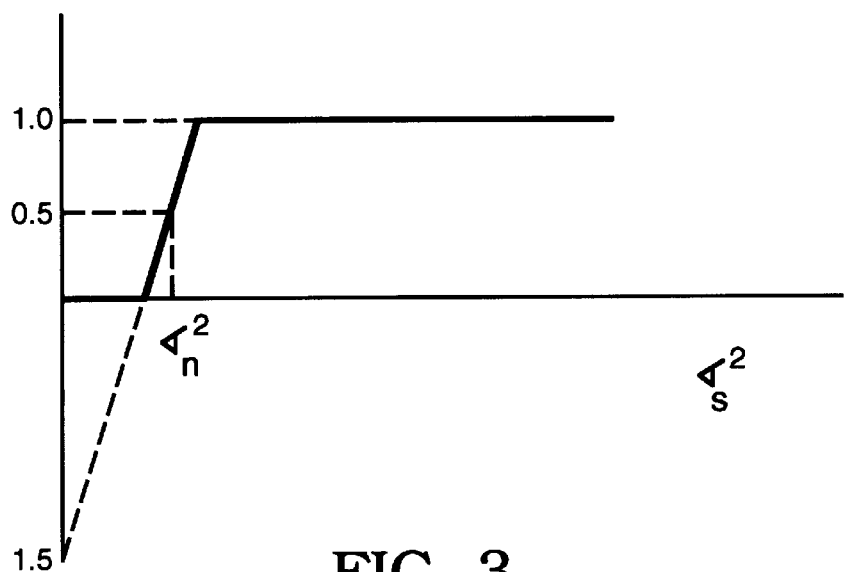
FIG. 3 shows a piecewise linear approximation to the characteristic value $\alpha$ in an adaptive Wiener filter used in one embodiment of the present invention.

This piecewise linear approximation is illustrated in FIG. 3.

Temporal filter 101 computes a temporally noise-reduced pixel using the following filter equation:

$$f_i = \gamma p_i^{(0)} + (1-\gamma) p_i^{(-1)} \qquad (9)$$

where $\gamma$ is a weight, typically given a value of 0.9, $p_i^{(0)}$ is a pixel value of the current frame and $p_i^{(-1)}$ is the value of the pixel in the previous frame corresponding to $p_i^{(0)}$.

As discussed above, the output video signals of temporal filter 101 and spatial filter 102 are combined in weighted average circuit 104 to provide the output video signal for system 100. The difference $d_i$ is computed in weight function filter 103 based on a difference $d_i$ in corresponding pixel values $p_i^{(0)}$ and $p_i^{(-1)}$ in successive frames:

$$d_i = \text{abs}\,(p_i^{(0)} - p_i^{(-1)}) \qquad (10)$$

The difference $d_i$ is used as a surrogate measure for motion. Difference $d_i$ is then used to compute weight function $\beta$, which rolls off very quickly with the magnitude of $d_i$. Weight function $\beta$ is given by the following equation:

$$\beta = (1-d_i)^{50} \qquad (11)$$

Since weight function $\beta$ is designed to have a value close to zero in the presence of motion, and to have a value of 1, in the absence of motion. To avoid the cost of exponentiation, weight function $\beta$ can be approximated, as in the case of Weiner characteristic value $\alpha$ above, by a piecewise linear function with a steeply sloped linear segment for $\beta$ values between 0 and 1.

Weighted average circuit 104 provides the output video signal at terminal 106 according to the following equation:

$$p_i^{(nr)} = \beta f_i + (1-\beta) w_i \qquad (12)$$

where $p_i^{(nr)}$ is the noise-reduced output pixel in the video signal at terminal 106.

Thus, due to the rapid roll-off of the weight function $\beta$, equation (12) allows the output video signal to be weighted towards the output signal of the spatial filter rapidly for small increase in motion. Weight function $\beta$ is so designed because temporal noise reduction eliminates noise without spatial softening of the image, but provides a smearing effect in the presence of motion. Weight function $\beta$ ensures that temporal artifacts are suppressed, but temporal noise reduction is used as much as possible. Thus, the output video signal resulting from equation (12) is suited for use in reducing film grain noise. The output video signal at terminal 106 can then be efficiently compressed.

The source code for one implementation of system 100 on two TI MVPs is included in Appendix A. In that implementation, 8 bit pixel values are received and provided. Intermediate computations are carried out in 16-bit fixed point arithmetic.

The above detailed description is provided to illustrate specific embodiments of the present invention is not intended to be limiting. Numerous variations and modifications are possible within the scope of the present invention. The present invention is defined by the following claims.

I claim:

1. A system for processing a video signal, comprising:

a temporal filter receiving said video signal and providing a temporal noise reduced video signal and a motion signal indicative of motion in said video signal;

a spatial filter receiving said video signal and providing a spatial noise reduced video signal; and a weighted average circuit receiving said motion signal, said temporal noise reduced video signal and said spatial noise reduced video signal, said weighted average circuit combining said temporal noise reduced video signal and said spatial noise reduced video signal according to said motion signal to provide an output video signal, said output video signal being weighted towards said temporal noise reduced video signal, when said motion signal indicates substantially no motion, and being weighted towards said spatial noise reduced video signal, otherwise.

2. A system as in claim 1, wherein said spatial filter utilizes local means and variances.

3. A system as in claim 1, wherein said spatial filter comprises an adaptive Wiener filter.

4. A system as in claim 3, wherein said adaptive Wiener filter includes a piecewise linear approximation.

5. A system as in claim 1, wherein said spatial filter takes into account pixels of said video signal configured in a 5-pixel kernel.

6. A system as in claim 1, wherein said temporal filter computes a weighted average of pixels in two successive frames.

7. A system as in claim 1, wherein said motion signal represents a difference between pixels in successive frames, and wherein said temporal noise reduced video signal and said spatial noise reduced video signal are weighted in said output video signal non-linearly with respect to said difference.

8. A method for processing a video signal, comprising:

temporally filtering said video signal to provide a temporal noise reduced video signal and a motion signal indicative of motion in said video signal;

spatially filtering said video signal to provide a spatial noise reduced video signal; and providing a weighted average of said temporal noise reduced video signal and said spatial noise reduced video signal according to said motion signal to provide an output video signal, said output video signal being weighted towards said temporal noise reduced video signal, when said motion signal indicates substantially no motion, and being weighted towards said spatial noise reduced video signal, otherwise.

9. A method as in claim 8, wherein said step of spatially filtering utilizes local means and variances.

10. A method as in claim 8, wherein said step of spatially filtering comprises the step of adaptive Wiener filtering.

11. A method as in claim 10, wherein said adaptive Wiener filtering step includes an approximation step using a piecewise linear approximation.

12. A method as in claim 8, wherein said spatially filtering step takes into account pixels of said video signal configured in a 5-pixel kernel.

13. A method as in claim 8, wherein said temporally filtering step computes a weighted average of pixels in two successive frames.

14. A method as in claim 8, wherein said motion signal represents a difference between pixels in successive frames, and wherein said temporal noise reduced video signal and said spatial noise reduced video signal are weighted in said output video signal non-linearly with respect to said difference.

* * * * *